United States Patent
Kountanya et al.

(10) Patent No.: US 8,148,282 B2
(45) Date of Patent: Apr. 3, 2012

(54) METHOD OF SOLID PCBN SYTHESIS

(75) Inventors: Raja Kountanya, Columbus, OH (US); Stephen Dole, Columbus, OH (US)

(73) Assignee: Diamond Innovations, Inc., Worthington, OH (US)

(*) Notice: Subject to any disclaimer, the term of this patent is extended or adjusted under 35 U.S.C. 154(b) by 20 days.

(21) Appl. No.: 12/562,404

(22) Filed: Sep. 18, 2009

(65) Prior Publication Data

US 2010/0069225 A1     Mar. 18, 2010

Related U.S. Application Data

(60) Provisional application No. 61/098,007, filed on Sep. 18, 2008.

(51) Int. Cl.
*C04B 35/5831*     (2006.01)

(52) U.S. Cl. .............. 501/96.4; 501/96.3; 501/98.6; 407/119

(58) Field of Classification Search .......... 501/96.4, 501/96.3, 98.6; 407/119
See application file for complete search history.

(56) References Cited

U.S. PATENT DOCUMENTS

| | | | |
|---|---|---|---|
| 3,944,398 A | 3/1976 | Bell | |
| 4,188,194 A | 2/1980 | Corrigan | |
| 4,666,466 A * | 5/1987 | Wilson | 51/307 |
| 5,271,749 A | 12/1993 | Rai et al. | |
| 5,332,629 A | 7/1994 | Sumiya et al. | |
| 5,890,847 A | 4/1999 | Uesaka et al. | |
| 6,001,758 A * | 12/1999 | Fukaya et al. | 501/96.4 |
| 6,395,107 B1 | 5/2002 | Subramanian | |
| 6,579,045 B1 | 6/2003 | Fries et al. | |
| 7,932,199 B2 * | 4/2011 | McHale et al. | 501/96.4 |
| 2005/0187093 A1 | 8/2005 | McHale, Jr. et al. | |
| 2009/0181238 A1 * | 7/2009 | Can et al. | 428/325 |

FOREIGN PATENT DOCUMENTS

| | | | |
|---|---|---|---|
| EP | 1950189 | | 7/2008 |
| GB | 2048927 | | 12/1980 |
| JP | 53117386 | * | 10/1978 |
| JP | 54134011 | * | 10/1979 |
| JP | 56164075 | * | 12/1981 |
| JP | 58204876 | * | 11/1983 |
| WO | 01/55458 | | 8/2001 |
| WO | 2005/082809 | | 9/2005 |
| WO | 2006046124 | * | 5/2006 |

OTHER PUBLICATIONS

Kountanya, R. K. et al., "Optimization of machining of automotive components with polycrystalline cubic boron nitride", Proc. IMechE vol. 222 Part B: J. Engineering Manufacture, pp. 797-805.

* cited by examiner

*Primary Examiner* — Karl Group
(74) *Attorney, Agent, or Firm* — Maria C. Gasaway

(57) ABSTRACT

The invention generally relates to a sintered CBN composite compact having a non-CBN portion. The compact includes about 86 to about 90% CBN and the non CBN portion contains borides and nitrides of Al. The compact is for use as a cutting tool insert in continuous machining of gray cast iron. The sintered compact has a thermal conductivity of 1.25-4 W/cm/° K. in the temperature range of about 200° C. to about 600° C. and sonic velocity of at least about 14.5 Km/sec at room temperature.

4 Claims, 1 Drawing Sheet

METHOD OF SOLID PCBN SYTHESIS

CROSS REFERENCES TO RELATED APPLICATIONS

The instant application claims the benefit of prior U.S. Provisional Application Ser. No. 61/098,007, filed Sep. 18, 2008.

BACKGROUND

Pearlitic gray cast iron (120-250 BHN) is a widely used material in many automotive components. In spite of the relative ease of machining of this material, variations in tool-life can lead to expensive downtimes and tool-costs. Polycrystalline cubic boron nitride (PCBN) cutting tool materials successfully machine gray cast iron at very high speeds of ~1,000 m/min. The actual magnitude of tool-life measured in cumulative minutes of cutting is rather high (~100 min). End of tool life is usually determined when either the finished part does not possess the desired dimensions or surface finish for set process parameters. Both occur when tool wear on the insert is higher than normal.

However, rising productivity requirements and lower capital expenditure are driving the need for greater tool-life in established machining operations. Moreover, variability in PCBN tool-life due to the age of the casting between shakeout from the mold and machining is also a consideration. An increasing number of cases are being reported in the industry where tool-life has dropped below the usual limit (100%) on the number of parts set for tool-life when the age of the casting is less than 100 hrs. Furthermore, in cases where a negative cutting geometry is employed, solid PCBN inserts for machining are more economical than carbide-supported geometries. This is usually due to lower insert cost per part accounting for down-time for tool changes and also due to greater number of cutting corners per insert in a solid PCBN insert. Efforts to tailor the physical and thermochemical properties of the PCBN insert material and coatings on the insert have been underway for many decades in the cutting tool industry, buts success however depends on sound understanding of the fundamentals of machining and of the application.

During machining, in addition to cutting geometry and process parameters, all thermophysical and physiochemical properties of the cutting tool material are brought to bear in determining tool life and performance. The cutting zone is one of high local temperatures and moderately high pressures and stresses. Generally, lower cutting zone temperatures and chip-tool interface temperatures promote greater tool-life in gray cast iron machining, but only a small proportion (~5-10%) of the heat generated in the chip is transmitted into the cutting tool. This small proportion also decreases as cutting speed increases. From this standpoint, given that gray cast iron is machined at high cutting speeds, it is not expected that even drastic changes in thermal properties of the cutting tool will produce a commensurately lower chip-tool interface temperature. In a few other machining applications also, it can be seen that tool life of ceramic cutting tool materials like PCBN is less sensitive to cutting tool temperature. Therefore, an undertaking to improve thermal transport properties such as diffusivity (hereinafter referred to as κ) and conductivity of the PCBN, among its various physical properties, for machining of gray cast iron does not seem like an obvious choice. Two mechanisms of thermal transport are electron scattering and photon scattering.

Sonic velocity (hereinafter v) is another physical property of ceramics. As measured using the scanning acoustograph instrument it records the speed of longitudinal compression waves in the sintered solid. PCBN, owing to its high Elastic modulus (~720 GPa) and low density (~3.5 g/cm$^3$), possesses a very high v. PCBN compacts are normally isotropic in nature and devoid of residual porosity. It may generally be said that v is a measure of the contiguity of the microstructure to transmit normal and shear tractions. Consequently, binder content, binder chemistry and multi-modality, i.e., the presence of a multiplicity of peaks in the grain-size distribution are all encapsulated in v measurements. In the current invention, the relation of v to κ of solid PCBN compacts is both revealed and utilized. Sintering conditions and sintering constituents are tailored specifically to increase room temperature v of the sintered compact. This has the desirable result of increasing κ over a prescribed range of temperature.

In the current invention, the scope of application of inserts made from the PCBN compact is continuous, dry gray iron machining operations. Thermal cracks and chipping of the cutting edge do not frequently occur in dry continuous gray cast iron machining because the workmaterial advancing to the cutting edge is considerably softened and the cutting forces are relatively stable. The coefficient of thermal expansion (CTE) is critical to machining performance only when the cutting edge undergoes rapid cyclical expansions and contractions, not applicable to the scope covered in this invention. FIG. 1 shows an example of a solid PCBN insert worn from continuous machining of gray cast iron. The thermal cracking mode of edge damage, as described earlier, is completely absent.

DETAILED DESCRIPTION

Figure 1:
FIG. 1 shows an example of a solid PCBN cutting tool worn during the continuous machining of gray cast iron.

Before the present methods, systems and materials are described, it is to be understood that this disclosure is not limited to the particular methodologies, systems and materials described, as these may vary. It is also to be understood that the terminology used in the description is for the purpose of describing the particular versions or embodiments only, and is not intended to limit the scope. For example, as used herein and in the appended claims, the singular forms "a," "an," and "the" include plural references unless the context clearly dictates otherwise. In addition, the word "comprising" as used herein is intended to mean "including but not limited to." Unless defined otherwise, all technical and scientific terms used herein have the same meanings as commonly understood by one of ordinary skill in the art. As used herein, the term "about" means plus or minus 10% of the numerical value of the number with which it is being used. Therefore, about 50% means in the range of 45%-55%.

A summary of the measurement techniques used in the current invention are described for reference. Thermal diffusivity as a function of temperature was measured using the Laser-Flash Technique standardized in ASTM E1461. Room Temperature density was measured using the simple Archimedes technique of weighing the sample and measuring its volume by immersing in a liquid. Density is not thought to vary significantly with temperature, owing to the extremely low CTE of PCBN compacts (~4.8×10$^{-6}$/° C.). Specific heat as a function of temperature was measured using a Differential Scanning Calorimeter discussed in King A. *Ceramic*

*Technology and Processing*: Noyes Publications 2002. Thermal conductivity K as a function of temperature T was determined using the formula $K(T)=\kappa(T) C_P(T)\rho$, where $K(T)$ is the thermal conductivity, $\kappa(T)$ is the thermal diffusivity and $C_p(T)$ is the specific-heat, all as functions of temperature and $\rho$ is the density. The error in measurement of thermal diffusivity and specific heat was determined as a function of temperature by taking measurements on two samples each from two different PCBN material grades. It was determined that the error in specific heat measurement was negligibly small (~1%), at most 0.014 J/g/° K. in the temperature range of about 23° C. to about 1,1000° C. Room Temperature sonic velocity was measured using the Scanning Acoustograph instrument, which records the time delay between two reflected waves from either faces of the solid compact. This time-lag along with a precise thickness measurement was used to determine the sonic velocity. Error in sonic velocity measurements was estimated to be about 0.08 km/sec.

The invention generally relates to a cubic boron nitride (cBN) composite with improved properties for continuous machining of gray cast iron. The composite includes a CBN portion and a non CBN portion. In particular, the composite is prepared from a constituent mixture which includes about 91 to about 94 percent by weight (wt. %) cBN and in the non CBN portion about 6 to about 9 wt. % aluminum. The CBN particles in the composite are at least bimodal in size distribution, and preferably a multimodal distribution. Other distributions, such as substantially homogeneous distributions and seemingly random distributions, are possible.

An embodiment of the invention includes a bimodal distribution of cBN particles in the composite. The bimodal distribution includes coarse grain size particles and fine grain size particles. The coarse grain size particles may be about 10 to about 60 µm. The fine grain size particles may be about 1 about 12 µm. In another embodiment, fine grain size particles may be about 5% lower than that of the coarse grain size particles. In an alternate embodiment, a multimodal distribution of cBN particles in the composite may be selected such that the fine grain size particles may be about 10 to about 50% of the total cBN content. The size distribution of the particles achieves the desired thermal conductivity over a temperature range and sonic velocity at room temperature.

The cBN composite preferably has a thermal conductivity at room temperature in the range of about 1.5 about 4.0 W/cm/° K. at room temperature and at least about 1.25 W/cm/° K. at about 600° C. The cBN composite has a sonic velocity of at least about 14.5 kilometers per second. The cBN composite of the present invention can be used in a cutting insert in continuous machining of gray cast iron with an aging time of less than about 100 hours resulting in a high tool life.

Figure 2:
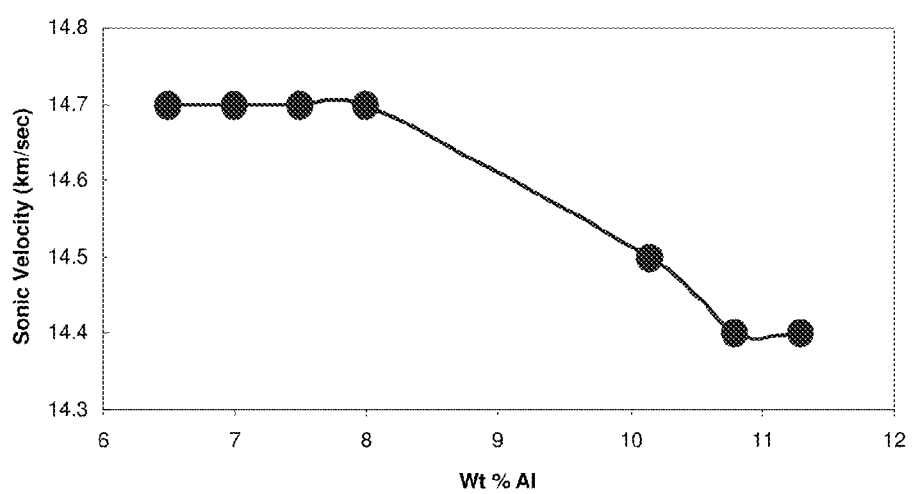
FIG. 2 shows the effect of aluminum content in the constituent mixture on sonic velocity of sintered compact.

During the sintering process, aluminum being a low melting element melts and percolates around the cBN particles. When a certain temperature is exceeded, the aluminum reacts completely with the cBN particles. Naturally, for varying levels of aluminum added to the constituent mixture, the resulting PCBN compact has varying levels of cBN and reaction compounds of aluminum. To understand this effect better, sonic velocity of a bimodal mixture of cBN: about 80% coarse particles (~20 µm grain-size) and about 20% fine particles (~3 µm grain-size) was measured for different amounts of aluminum added. This is shown plotted in FIG. 2. At levels of above 10 wt % Al content in the constituent mixture, the sonic velocity falls below about 14.5 km/sec. Above about 8.5 wt % Al, metal filled cracks may appear in the sintered material. Below about 6 wt % Al, the sintered material will have cracks and/or unsintered zones. A suitable range is between about 6 wt % to about 10 wt % Al.

The composite of the invention may be prepared and sintered by any suitable method as understood by one skilled in the art. A process for making a sintered compact having a cBN portion and a non cBN portion includes preparing a mixture having about 91 to about 94 weight % cBN and a non cBN portion having about 6 wt % to about 10 weight % Al. The aluminum may occur as a powder or may be provided as a sheet or foil. The aluminum may also be dispersed in the constituent mixture as capsules comparable in size or substantially larger than the CBN particles themselves, with the intention of promoting directional or homogenous sintering.

The mixture includes at least a bimodal distribution of cBN particles. A sintered compact may be produced by subjecting the mixture to high pressure (about 40 to about 80 kbar) and high temperature (about 1000° C. to about 2000° C.) conditions. During the process, the aluminum content is converted completely to AlN and $AlB_2$ in the resulting sintered compact. Other reaction by-products in the sintered compact such as $AlB_6$ and $AlB_{12}$ are possible. These have the effect of reducing the cBN content in the final compact and are in general, undesirable. To understand these interactions better, x-ray diffraction (XRD) investigations were performed. They revealed that all the aluminum in the sintered compact exists in the combined form. There also was no evidence of the presence of $AlB_6$ and $AlB_{12}$. Therefore, from the stoichiometry of the reaction $⅔BN+Al→⅔AlN+⅓AlB_2$, the exact chemical composition of the sintered compact for the range of aluminum added to the constituent mixture can be computed. Table 1 gives this range of the minimum and maximum of the variations in the cBN and Al blends used in the invention.

TABLE 1

Wt % and Vol % Calculated for the range of compositions in the current invention

| | | Starting Material/Constituent Mixture (Actual) | | Sintered Material (Calculated) | | |
|---|---|---|---|---|---|---|
| | | CBN | Al | CBN | AlN | $AlB_2$ |
| Minimum | Wt % | 91 | 9 | 86 | 9 | 5 |
| | Vol % | 89 | 11 | 85 | 10 | 5 |
| Maximum | Wt % | 94 | 6 | 90 | 6 | 4 |
| | Vol % | 92 | 8 | 90 | 6 | 4 |

The Dulong and Petit law of thermochemistry relates the chemical composition of a substance directly to the specific heat without reference to the intermediary microstructure and phases in the solid. Therefore, for known amounts of starting materials utilized, the stoichiometry of complete reaction of aluminum with CBN during sintering dictates the final products that will be formed in the sintered compact. This can easily be used to predict the specific heat of the sintered products as a function of temperature. However, thermal diffusivity and conductivity depend not only on the chemical composition of the sintered compact, but also the resulting microstructure.

Thermal conduction in solid PCBN compacts such as those in the current invention is mostly a result of phonon transport and less due to electron transport. Phonon scattering mechanisms, which depend on the distribution of defects, grain-boundaries etc, determine the thermal conductivity and diffusivity of the final sintered compact. Therefore, differences in sintering conditions such as temperature, pressure and duration will be reflected only in the thermal diffusivity $\kappa$ of the sintered compact and not in the specific heat. Consequently, it is sufficient to examine only the thermal diffusivity of the sintered compact as along as the same starting materials were used in the constituent mixture.

TABLE 2

Effect of Sonic Velocity on Thermal Diffusivity (cm²/s).

| Sonic Velocity (Km/sec) | 200° C. | 400° C. | 600° C. |
|---|---|---|---|
| 14.35 | 0.461 | 0.306 | 0.233 |
| 14.7 | 0.493 | 0.328 | 0.249 |
| Error in thermal diffusivity | 0.004 | 0.006 | 0.007 |

Error in sonic velocity measurement = 0.08 Km/sec

Table 2 above shows the effect of sonic velocity on thermal diffusivity over a range of temperatures for candidate materials synthesized as taught in the instant application. It is clear that choice of sintering conditions leading to a higher sonic velocity increases the thermal diffusivity as well over the temperature range of about 20 to about 600° C. Limiting the aluminum content to about 6 wt % to about 9 wt % not only produces compact blanks with high yield, but also ensures that the sonic velocity of the compact is adequately high.

TABLE 3

Effect of thermal conductivity on machining performance

| Samples | Thermal Conductivity W/cm/° K | | | Performance in Application (% of Target) |
|---|---|---|---|---|
| | 200° C. | 400° C. | 600° C. | |
| Comparative Sample A | 1.324 | 1.235 | 1.104 | <100 |
| Comparative Sample B | 1.498 | 1.355 | 1.164 | <100 |
| Comparative Sample C | 0.877 | 0.891 | 0.810 | <100 |
| Inventive Sample D | 1.556 | 1.408 | 1.272 | >100 |
| Inventive Sample E | 1.554 | 1.410 | 1.253 | =100 |
| Error in thermal conductivity Measurement | 0.034 | 0.017 | 0.024 | |

Table 3 above shows the results of machining tests at an actual end user manufacturing gray iron brake-discs. Solid PCBN cutting inserts made with the inventive sintered compacts were tested alongside commercially available inserts made from comparative sintered compacts. All the tests were performed in continuous machining operations such as facing and turning of the different features of the brake-disc. The age of the castings after shakeout was also monitored. Performance was quantified based on whether the inventive and comparative tool samples were able to deliver tool life obtainable earlier, when the age of the castings was relatively large (~200-1,000 hrs). The objective in the tests was to find solid PCBN insert grades which would produce at least the tool life achievable earlier. The tests established that the inventive samples outperformed the commercially available samples beyond reasonable doubt. However, to make clear how the embodiments may be adopted examples are provided in the following:

EXAMPLE 1

Comparative Sample A

This represents a commercially available sample and produced a result below 100% in the field application test. The PCBN compact used herein contains a unimodal CBN grain-size distribution as revealed by optical microscopy. X-ray diffraction analysis revealed AlN, AlB$_2$ and CBN and Si compounds in the PCBN compact.

EXAMPLE 2

Comparative Sample B

This sample, commercially available, but believed to be prepared based on the teachings in U.S. Pat. No. 4,666,466 and Great Britain U.S. Pat. No. 2,048,927 was tested and also produced a result below 100% in the field application test. The PCBN compact used herein contains a multi-modal CBN grain-size distribution as revealed by optical microscopy. X-ray diffraction analysis revealed only AlN, AlB$_2$ and CBN in the PCBN compact, similar to the present invention.

EXAMPLE 3

Comparative Sample C

This sample, commercially available, but prepared according to the teachings of U.S. Patent Publication No. 2005/0187093 A1 was tested and also produced a result below 100% in the field application test. The PCBN compact used herein contains a multi-modal CBN grain-size distribution as revealed by optical microscopy. X-ray diffraction analysis revealed a multiplicity of compounds of Al, Ti etc besides CBN in the PCBN compact.

EXAMPLE 4

Inventive Sample D

An embodiment involves mixing coarse CBN particles (~20 μm grain-size) and fine CBN particles (~3 μm grain-size) in a ratio of 80:20 by weight. The mixture was loaded into graphite cups, for example along with aluminum sheets in the top and bottom corresponding to 7.5 wt. % aluminum. The cups are subsequently loaded into a high-pressure/high-temperature cell and subjected to sintering conditions for 30-40 mins. After sintering the sintered compacts are ground into circular blanks. Laser cutting was then used to fabricate inserts from the compact and these were again finish ground to standard insert dimensions and edge-preparations. Inserts from these inventive compacts were then tested in the machining application at the end user. This sintered compact corresponds to Inventive Sample D in Table 3 and performance greater than 100% in the machining application.

EXAMPLE 5

Inventive Sample E

Another embodiment involves mixing coarse CBN particles (~20 μm grain-size) and fine CBN particles (~3 μm grain-size) in a ratio of 60:40 by weight. The mixture was then encapsulated, for example, in a graphite cup with sheets of aluminum placed on the top and bottom so that aluminum to the extent of 7.5 wt. % is added. This sintered compact corresponds to Inventive Sample E in Table 3 and delivered 100% in the machining application.

Data in Table 3 also indicates that the Inventive samples possess a thermal conductivity greater than the comparative samples in the temperature range of about 200° C.-600° C. Also note that the increase in thermal conductivity of the inventive samples is above the margin of error, but the increase is only about 3-30%. This was rather surprising. As mentioned earlier, chip-tool interface temperatures are not sensitive to such small increases in thermal conductivity. Yet an improvement in machining performance is seen herein with the current invention with a only modest increase in thermal conductivity.

Furthermore, comparing the performance of Inventive Samples D and E, it is clear that a specific bimodality is preferred in the application. Those skilled in the art will realize that machining performance can be easily enhanced by optimizing the microstructure to include CBN grain-size distribution containing more than two peaks. There exists no constraint in preparing a solid PCBN according to the current invention to incorporate a diversity of peaks in the grain-size distribution of the CBN particles.

Although the present invention has been described in considerable detail with reference to certain preferred embodiments thereof, other versions are possible. Therefore the spirit and scope of the appended claims should not be limited to the description and the preferred versions contained within this specification.

The invention claimed is:

1. A sintered cubic boron nitride composite compact having a non-cBN portion, the compact comprising:
   about 86 to about 90 wt. % cBN; and
   the non cBN portion consisting essentially of about 10 to about 14 wt.
   % AlN, $AlB_2$ and other borides of Al;
   wherein the compact has a cBN grain size distribution that is at least bimodal and comprises about 80% coarse particles ranging in size from about 10 to about 60 μm and about 20% fine particles ranging in size from about 1 about 12 μm.

2. The sintered cubic boron nitride composite compact according to claim 1, said compact having a thermal conductivity at room temperature of about 1.25 to about 4 W/cm ° K in the temperature range of about 200° C. to about 600° C.

3. The sintered cubic boron nitride composite compact according to claim 1, said compact having a sonic velocity of at least about 14.5km/s.

4. The sintered cubic boron nitride composite compact according to claim 1, wherein said compact comprises a cutting insert for continuous machining of gray cast iron with an aging time of less than about 100hours.

* * * * *